Feb. 21, 1928.
R. P. BROWN
1,659,804
THERMOELECTRIC PYROMETER
Filed Aug. 7, 1923
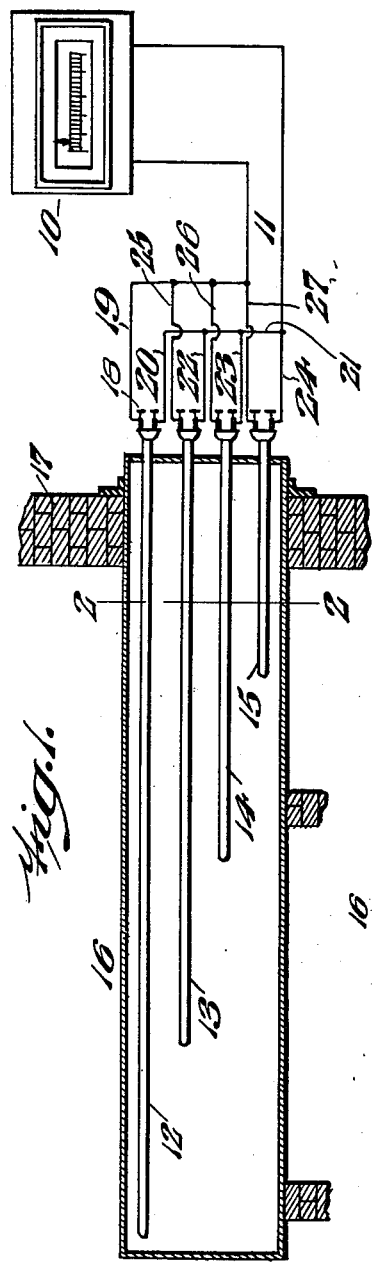
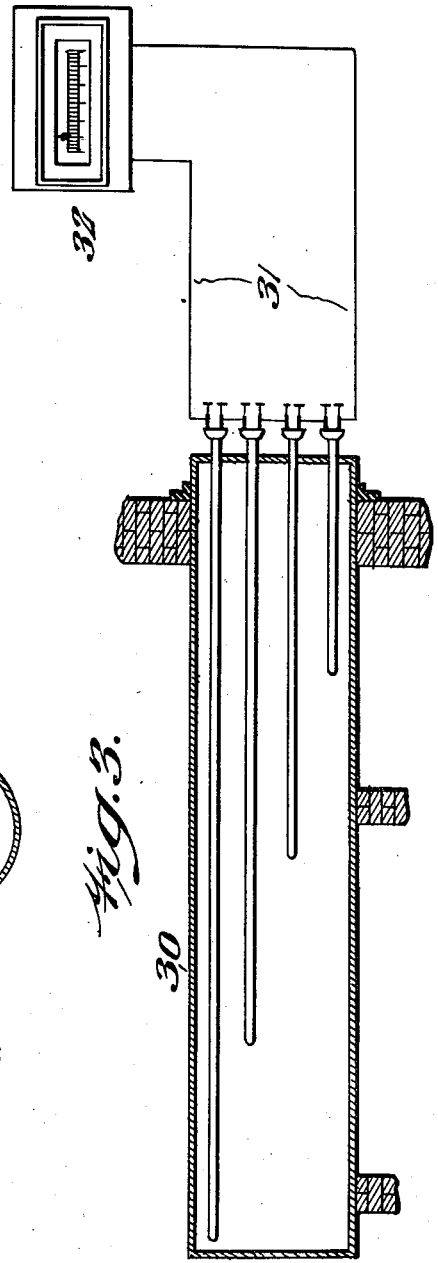
INVENTOR
Richard P. Brown.
BY
Robert M. Barr.
ATTORNEY Patented Feb. 21, 1928.

1,659,804

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

THERMOELECTRIC PYROMETER.

Application filed August 7, 1923. Serial No. 656,305.

Some of the objects of the present invention are to provide an improved thermoelectric pyrometer; to provide a thermoelectric pyrometer whereby an average condition can be determined from a plurality of devices responsive to that condition; to provide a thermoelectric pyrometer so arranged and constructed as to indicate the average temperature of a furnace or other hot zone; to provide a thermoelectric pyrometer including a plurality of thermocouples so arranged and combined as to indicate on the pyrometer the average of the temperatures to which the aforesaid thermocouples are subject; and to provide other improvements as will hereinafter appear.

In the accompanying drawings, Fig. 1 represents a side elevation in part section of a thermoelectric pyrometer embodying one form of the present invention and shown passing through a furnace wall; Fig. 2 represents a section on line 2—2 of Fig. 1; Fig. 3 represents a side elevation also in part section and showing another form of the invention.

Referring to the drawings, one form of the present invention comprises a thermoelectric pyrometer including an electrical measuring instrument 10, such, for example, as a milli-voltmeter or any other suitable electric instrument for indicating temperatures, voltage or any other quantity or condition to be measured. In addition to the instrument 10, the pyrometric system includes an electrical circuit 11, for connecting the instrument with the thermoelectric couple or other device which is responsive to the temperature to be measured.

For the purpose of taking readings or indicating an average temperature in a furnace, the pyrometric system of the present invention includes a plurality of thermocouples 12, 13, 14 and 15, all of which in the present instance are enclosed in a protecting tube 16 which projects through the wall 17 of a furnace and is thereby within the hot zone of the furnace. The protecting tube 16 may be of any suitable length to properly cover the desired hot zone, but where it is located within the last pass of a boiler in a power plant, this protecting tube 16 is some twenty feet in length, while the enclosed thermocouples are of varying lengths. Thus, for example, the thermocouple 12 extends substantially throughout the length of the tube 16; the thermocouple 13 extends, for example, three-quarters of the length of the tube 16; the thermocouple 14 extends, for example, one-half the length of the tube 16; and the thermocouple 15 extends, for example, one-quarter of the length of the tube 16. In this way, allowance is made for varying temperatures throughout the pass of the boiler, and each thermocouple responds to the temperature to which it is subject, while all together effectually cover the area the temperature of which is to be measured. While four thermocouples have been selected for purposes of illustration, it is to be understood that the invention is not limited to any specific number, and variation of the number of thermocouples is not to be considered a departure from the invention.

In order to connect the several thermocouples to the instrument 10 to give the average temperature of the furnace, the terminals of the respective thermocouples are preferably, and as shown in Fig. 1, connected in multiple with the circuit 11 which includes the instrument 10. Thus, thermocouple A has its terminal 18 connected by conductor 19 to the circuit, and terminal 20 connected to a common conductor 21, to which the respective terminal wires 22, 23 and 24 join from one terminal of each of the other thermocouples. The conductors 25, 26 and 27 connect the remaining terminal of each of the thermocouples to the side of the circuit including the wire 19, and thus complete the multiple circuit. In so connecting the plurality of thermocouples to the instrument 10 to give a reading which is a true average of the temperatures to which the four thermocouples are exposed each thermocouple have the same internal resistance, say, for example, .932 ohms. The means for providing the same internal resistance for each thermocouple consists of constructing the several thermocouples of different size thermocouple wire, and in this instance the long thermocouple 12 is formed of No. 8 gauge Chromel and Constantan wire; the next longest thermocouple 13 of No. 9 gauge Chromel and Constantan wire; the thermocouple 14 of No. 11 gauge Chromel and Constantan wire; and the shortest thermocouple 15 of No. 24 gauge Chromel and Constantan wire. Of course, the material of the thermocouple wire can be any suitable for the purpose.

The fact that an average of the temperatures to which the thermocouples 12, 13, 14, and 15 are exposed can be obtained with the thermocouples connected in multiple to the measuring instrument will be apparent from the following explanation: Assume that E represents the electromotive force impressed on the circuit 11 by the conjoint action of the four thermocouples, and that R represents the resistance of the circuit 11 including the instrument 10 and the conductor portions of the circuit 11 between the instrument terminals and the points at which those conductors are connected to the conductors 19 and 21, and that I represents the current flowing through the instrument. Assume further that $E^{12}$ represents the electromotive force, and that $r$ represents the internal resistance of the thermocouple 12; and that $I^{12}$ represents the current flowing through the thermocouple 12; and that $E^{13}$, $E^{14}$, and $E^{15}$ respectively, represent the electromotive forces of the couples 13, 14, and 15, and that $I^{13}$, $I^{14}$, and $I^{15}$ represent the currents flowing through the thermocouples 13, 14, and 15 respectively, and that the internal resistances of each of the thermocouples 13, 14, and 15 is $r$, the same as the resistance of the thermocouple 12. From these assumptions and the well known laws governing the relations between voltage drops, resistances, and current strengths in electric circuits, we have:

$E = IR$;
$I = I^{12} + I^{13} + I^{14} + I^{15}$; and
$E = E^{12} - rI^{12} = E^{13} - rI^{13} = E^{14} - rI^{14} = E^{15} - rI^{15}$.

It will be understood, of course, that in the case of any thermocouple, for example the thermocouple 12, which is sufficiently colder than the other thermocouples, the electromotive force $E^{12}$ of the thermocouple will be smaller than E, and the current flow $I^{12}$ will then be negative in the equation $$E^{12} - I^{12}r = E.$$

From the equations given above, by simple algebra the following equation may readily be derived:

$$E^{12} + E^{13} + E^{14} + E^{15} - Ir = 4IR,$$

or $$\frac{E^{12} + E^{13} + E^{14} + E^{15}}{4} = I\left(R + \frac{r}{4}\right).$$

Since the left hand number of the last equation is the average of the electromotive forces of the four thermocouples and the expression $R + \frac{r}{4}$ is a constant, it follows that the current I flowing through the instrument 10 is proportional to the average of the electromotive forces of the different thermocouples, and hence to the temperatures to which they are subjected. It will be understood, of course that $\frac{r}{4}$ represents the joint or aggregate resistance of the four thermocouples when connected in parallel, and that the expression $R + \frac{r}{4}$ represents the total resistance of the meter circuit for which the meter should be calibrated. If R is very large with reference to $r$, as would ordinarily be the case, the instrument will indicate with sufficient accuracy the temperature to which any one thermocouple is subjected, if the others are disconnected from the instrument, and, of course, will indicate the average temperature of two or three of the thermocouples if two or one of the four shown are disconnected.

Where, as will often be the case, the temperatures to which the different thermocouples are subjected are all of the same order, the instrument range will be approximately the same with a single thermocouple connected to the instrument as when a plurality of the thermocouples are connected in parallel to the instrument. If in determining furnace conditions by temperature observations at different points, it is desirable to give more weight to the temperature at one point of observation than at another, this result can be obtained with the thermocouples connected in parallel, by making the internal resistance of the thermocouple at the one point less than the internal resistance of the thermocouple at the other point. This produces a change in the instrument readings which is obviously a definite function of the difference in the internal resistances of the two thermocouples. In general, however, I consider it practically desirable to use thermocouples of the same internal resistances.

A further advantage of the connection of thermocouples of the same internal resistances in parallel with the instrument arises from the fact that if any thermocouple becomes inoperative, the system will still function with the remaining thermocouples.

As a modification of the foregoing construction, another form of the invention is shown in Fig. 3, wherein the plurality of thermocouples generally indicated at 30 have their terminals connected in a series circuit 31 with the electric measuring instrument 32. In view of this circuit arrangement it is necessary, in order to accurately indicate the thermoelectric quantities, the instrument 32 must be capable of responding to a voltage equal to four times the E. M. F. of a single thermocouple, as will be readily understood. An advantage of a series circuit in a pyrometric system of this character is that if a thermocouple burns out during the operation of the furnace the entire circuit of the system is open, and of course it follows that it has the disadvantage that the whole equipment fails to function should one thermocouple burn out.

Although only two forms are shown in which this invention may be embodied, it is to be understood that the invention is not limited to any specific construction, but might be applied in various forms without departing from the spirit of the invention or the scope of the appended claims.

Having fully described my invention, what I claim is:

1. Means for determining average temperature conditions at different points in a furnace zone comprising in combination a plurality of thermocouples adapted to be located one at each of said points and of definitely related internal resistances, an electrical measuring instrument and means connecting said thermocouples in multiple to said instrument.

2. Means for determining average temperature conditions at different points in a furnace zone comprising in combination a plurality of thermocouples adapted to be located one at each of said points and all of the same internal resistances, an electrical measuring instrument and means connecting said thermocouples in multiple to said instrument.

3. In a pyrometric system, the combination of an electrical measuring instrument, an electrical circuit including said instrument, a plurality of thermocouples of different length arranged to be located in a heated zone, each of said thermocouples being constructed of different size wire than any of the others to provide the same internal resistance for each thermocouple, and being so connected in multiple in said circuit that the simultaneous functioning of said thermocouples causes said instrument to respond to the average electrical action of all of said thermocouples.

4. In a pyrometric system, the combination of an electrical measuring instrument, an electrical circuit including said meter, a plurality of thermocouples arranged to be located in a heated zone and connected in multiple in said electrical circuit whereby said instrument indicates the average electrical indication of all of said thermocouples.

5. In a pyrometric system, the combination of an electrical measuring instrument, an electrical circuit including said instrument, a plurality of thermocouples each having the same internal resistance, and a protecting tube enclosing all of said thermocouples, the thermocouple being located at intervals along the length of said tube and being so connected in said circuit that said instrument indicates the average electrical indication of all of said thermocouples.

6. In a pyrometric system the combination of an electrical measuring instrument, an electrical circuit including said instrument, a plurality of thermocouples each having the same internal resistance, and a protecting tube enclosing all of said thermocouples, said thermocouples being located at intervals along the length of said tube, and being connected in multiple in said circuit so that said instrument indicates the average electrical indication of all of said thermocouples.

7. In a pyrometric system, the combination of an electrical measuring instrument, an electrical circuit including said meter, a plurality of different size thermocouples each having the same internal resistance, and a protecting tube enclosing all of said thermocouples, said thermocouples being located at intervals along the length of said tube and being so connected into said circuit that said instrument indicates the average electrical indication of all of said thermocouples.

Signed at Philadelphia, county of Philadelphia, State of Pennsylvania, this 30 day of July, 1923.

RICHARD P. BROWN.